US010460604B2

(12) United States Patent
Sugiura et al.

(10) Patent No.: US 10,460,604 B2
(45) Date of Patent: Oct. 29, 2019

(54) COLLISION DETERMINATION APPARATUS, PSEUDO RANGE INFORMATION TRANSMITTING APPARATUS

(71) Applicant: DENSO CORPORATION, Kariya, Aichi-pref (JP)

(72) Inventors: Yasunobu Sugiura, Kariya (JP); Hiroyuki Kawashima, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 179 days.

(21) Appl. No.: 15/365,043

(22) Filed: Nov. 30, 2016

(65) Prior Publication Data

US 2017/0162048 A1 Jun. 8, 2017

(30) Foreign Application Priority Data

Dec. 2, 2015 (JP) ................................ 2015-236032

(51) Int. Cl.
*G08G 1/16* (2006.01)
*G01S 19/13* (2010.01)
(Continued)

(52) U.S. Cl.
CPC ............ *G08G 1/161* (2013.01); *G01S 5/0072* (2013.01); *G01S 19/13* (2013.01); *G01S 19/14* (2013.01);
(Continued)

(58) Field of Classification Search
None
See application file for complete search history.

(56) References Cited

U.S. PATENT DOCUMENTS 5,359,521 A * 10/1994 Kyrtsos ................... G01S 19/41
340/988
5,548,516 A * 8/1996 Gudat ..................... G01S 19/11
701/23
(Continued)

FOREIGN PATENT DOCUMENTS

JP 2012-022671 A 2/2012
JP 2014-044056 A 3/2014

*Primary Examiner* — Curtis J King
(74) *Attorney, Agent, or Firm* — Knobbe, Martens, Olson & Bear, LLP

(57) ABSTRACT

A collision determination apparatus used in a mobile body includes: a receiver receiving radio waves from reference stations; a pseudo range identifying unit identifying a pseudo range to a captured reference station; a self-single difference calculation unit calculating a self-single difference between a first reference station and a second reference station; a transmission unit transmitting a pseudo range associated information into surrounding the mobile body; a reception unit receiving the pseudo range associated information of an external apparatus; an external single difference identifying unit identifying an external single difference between the pseudo ranges to the first and second reference stations; a double difference calculating unit calculating a double difference between the self-single difference and the external single difference; and an approaching relationship determination unit determining whether or not the double difference tends to decrease and determining an approaching relationship when the double difference tends to decrease.

9 Claims, 5 Drawing Sheets

(51) Int. Cl.
*H04B 7/185* (2006.01)
*G01S 19/14* (2010.01)
*G01S 19/51* (2010.01)
*G01S 5/00* (2006.01)

(52) U.S. Cl.
CPC .............. *G01S 19/51* (2013.01); *G08G 1/163* (2013.01); *G08G 1/164* (2013.01); *G08G 1/166* (2013.01); *H04B 7/1851* (2013.01)

(56) References Cited

U.S. PATENT DOCUMENTS

| | | | | |
|---|---|---|---|---|
| 5,579,285 A * | 11/1996 | Hubert | .................. | G01S 5/0009 367/133 |
| 5,627,546 A * | 5/1997 | Crow | .................. | G01S 13/765 342/32 |
| 5,742,509 A * | 4/1998 | Goldberg | .............. | G01S 5/0027 340/990 |
| 6,133,867 A * | 10/2000 | Eberwine | .............. | G01S 5/0072 342/125 |
| 6,285,949 B1 * | 9/2001 | Roediger | .............. | G08G 1/0104 340/934 |
| 6,314,366 B1 * | 11/2001 | Farmakis | .............. | B60R 25/102 340/961 |
| 6,407,712 B1 * | 6/2002 | Turnbull | ................ | B60C 23/061 340/988 |
| 6,469,663 B1 * | 10/2002 | Whitehead | .............. | G01S 19/44 342/357.31 |
| 6,675,095 B1 * | 1/2004 | Bird | ..................... | G05D 1/0061 340/436 |
| 7,545,261 B1 * | 6/2009 | Harrington | ............ | G08G 1/163 340/435 |
| 8,948,972 B2 * | 2/2015 | Liu | .......................... | G08G 1/16 340/425.5 |
| 2005/0107954 A1 * | 5/2005 | Nahla | ................... | B61L 25/021 701/301 |
| 2005/0221759 A1 * | 10/2005 | Spadafora | ................ | G08G 1/09 455/41.2 |
| 2005/0259151 A1 * | 11/2005 | Hamilton | ................ | B60R 11/04 348/148 |
| 2006/0136291 A1 * | 6/2006 | Morita | .................... | G06Q 30/02 705/13 |
| 2007/0152814 A1 * | 7/2007 | Stefani | ..................... | G01S 19/14 340/539.22 |
| 2007/0244643 A1 * | 10/2007 | Tengler | .................. | G08G 1/161 701/301 |
| 2010/0164789 A1 * | 7/2010 | Basnayake | ............ | G01S 5/0072 342/357.23 |
| 2011/0054790 A1 * | 3/2011 | Kagawa | ................ | G01S 5/0072 701/472 |
| 2012/0277988 A1 * | 11/2012 | Sosulin | .................... | G01S 19/22 701/301 |
| 2013/0015963 A1 * | 1/2013 | Stegmaier | .............. | B60Q 1/525 340/435 |
| 2013/0021146 A1 * | 1/2013 | Stegmaier | .............. | G08G 1/162 340/436 |
| 2013/0116908 A1 * | 5/2013 | Oh | .......................... | G01S 19/07 701/96 |
| 2014/0225772 A1 * | 8/2014 | Tarlow | .................... | G01S 19/22 342/357.51 |
| 2014/0253369 A1 * | 9/2014 | Kelley | .................... | G01S 19/07 342/175 |
| 2015/0289163 A1 * | 10/2015 | Mineta | .................... | H04B 1/707 370/320 |
| 2016/0018527 A1 * | 1/2016 | Oh | .......................... | G01S 19/05 701/468 |
| 2016/0061614 A1 * | 3/2016 | Lee | ......................... | G01S 19/07 701/446 |
| 2016/0137059 A1 * | 5/2016 | Mader | .................... | B60K 28/066 340/575 |
| 2016/0205656 A1 * | 7/2016 | Zeng | ..................... | H04W 4/046 455/456.1 |
| 2016/0260328 A1 * | 9/2016 | Mishra | ................... | G08G 1/163 |
| 2017/0003396 A1 * | 1/2017 | Adachi | ................... | G01S 19/39 |
| 2018/0052005 A1 * | 2/2018 | Schilling | ................ | H04W 4/70 |
| 2018/0106906 A1 * | 4/2018 | Mikami | .................. | G01S 19/07 |

* cited by examiner

COLLISION DETERMINATION APPARATUS, PSEUDO RANGE INFORMATION TRANSMITTING APPARATUS

CROSS-REFERENCE TO RELATED APPLICATION

This application is based on and claims the benefit of priority from earlier Japanese Patent Application No. 2015-236032 filed Dec. 2, 2015, the description of which is incorporated herein by reference.

BACKGROUND (Technical Field)

The present disclosure relates to a collision determination apparatus in which a possibility of collision between an own vehicle and another vehicle is determined through a wireless communication performed by the apparatuses mounted on each of the vehicles, and a pseudo range information apparatus.

(Description of the Related Art)

In recent years, an inter-vehicle communication system has been proposed, in which each of a plurality of vehicles transmits communication packets each indicating vehicle information such as travelling speed of the own vehicle, current location and travelling direction, and subsequently receives packets transmitted from other vehicle.

As an apparatus used for such an inter-vehicle communication system, JP-A-2012-22671 discloses an apparatus that determines, based on positional information of the other vehicle obtained by the inter-vehicle communication and the positional information of the own vehicle, whether or not the own vehicle is likely to collide with other vehicle (hereinafter referred to as a collision determination apparatus).

More specifically, the above-mentioned collision determination apparatus disclosed in the above-described patent document determines, based on a relative speed of the other vehicle with respect to the own vehicle, a relative travelling direction, and a positional relationship between the own vehicle and the other vehicle, whether or not the own vehicle is likely to collide with an object other vehicle. The vehicle which is likely to collide with the own vehicle is defined as other vehicle having a relative distance which tends to decrease with respect to the own vehicle. For convenience, a relationship having mutual relative distances being decreased is referred to as an approaching relationship.

When the collision determination apparatus determines that the other vehicle is likely to collide with the own vehicle, the collision determination apparatus calculates, based on the above-described various information, a collision margin time which is a remaining time to collision (hereinafter referred to as TTC: Time to Collision). In the case where the TTC is less than a predetermined threshold, the collision determination apparatus issues an alert to the driver of the own vehicle.

It should be noted that the current locations of the respective vehicles can be identified by receiving radio waves from satellites (hereinafter referred to as GNSS satellites) used for a global navigation satellite system, i.e., GNSS. Generally, to identify the current location by using the radio waves transmitted from the GNSS satellite, radio waves transmitted by 4 or more GNSS satellites have to be captured.

According to related art disclosed in the above-mentioned patent document, to calculate the TTC relative to other vehicle, each of the own vehicle and other vehicle is required to complete a measurement of their current location (i.e., positioning) before calculating the TTC. To measure the current location, as described above, at least 4 GNSS satellites have to be captured.

Therefore, when the number of captured GNSS satellites is 3 or less, positioning cannot be accomplished so that the above-mentioned TTC cannot be calculated.

In this case, the apparatus cannot determine a possible approaching relationship between other vehicle and the own vehicle being communicated via an inter-vehicle communication.

SUMMARY

The embodiment provides a collision determination apparatus and a pseudo range information transmitting apparatus, in which an approaching relationship can be determined between the own apparatus and an external apparatus, even when at least the own apparatus or the external apparatus captures only three satellites.

A collision determination apparatus is used in a mobile body. The apparatus includes: a receiver receiving radio waves including sender information of a sender which transmits the radio waves, the radio waves being transmitted from a plurality of reference stations each being present in mutually different locations; a pseudo range identifying unit determining a captured reference station from which the radio waves are received among the plurality of reference stations, and successively identifying a pseudo range to the captured reference station based on the radio waves received by the receiver and transmitted from the captured station; a self-single difference calculation unit successively calculating a self-single difference between a first reference station and a second reference station which are different from each other, the first reference station and the second reference station being selected from two or more captured reference stations, and the self-single difference being a difference between the pseudo range to the first reference station and the pseudo range to the second reference station; a transmission unit transmitting pseudo range associated information to surroundings the mobile body by a wireless communication, the pseudo range associated information being determined depending on the pseudo range to the captured reference station identified by the pseudo range identifying unit, and the pseudo range associated information being used for an external apparatus which receives the information to identify the self-single difference in the mobile body; a reception unit receiving the pseudo range associated information of the external apparatus, the external apparatus being present outside the mobile body; an external single difference identifying unit successively identifying, based on the pseudo range associated information of the external apparatus received by the reception unit, an external single difference between the pseudo range to the first reference station of the external apparatus and the pseudo range to the second reference station of the external apparatus; a double difference calculating unit successively calculating a double difference between the self-single difference calculated by the self-single difference calculation unit and the external single difference identified by the self-single difference calculation unit; and an approaching relationship determination unit determining whether or not the double difference tends to decrease based on the double difference at a plurality of time points, and determining the external apparatus and the mobile body as being in an approaching relationship when the double difference tends to decrease.

According to the above-described configuration, the self-single difference calculation unit calculates a self-single difference which is a difference of the pseudo ranges between the first reference station and the second reference station for an own collision determination apparatus (hereinafter referred to as own apparatus). The external single difference identifying unit identifies, based on the pseudo range associated information transmitted from the external apparatus, an external single difference between the pseudo range to the first reference station of the external apparatus and the pseudo range to the second reference station of the external apparatus. The double difference calculation unit calculates the double difference which is a difference between the self-single difference and the external single difference.

The double difference thus calculated is a parameter determined depending on the pseudo ranges to the two reference stations commonly captured by the own apparatus and the external apparatus. In the case where the own apparatus and the external apparatus are moving possibly causing a collision therebetween, the double difference approaches 0 as the distance between the own apparatus and the external is shortened. It should be noted that the double difference is 0 when the own apparatus and the external apparatus are at the same location. In other words, the double difference is a parameter expressing a distance between the own apparatus and the external apparatus.

Accordingly, determining whether or not the double difference tends to decrease serves as information whether or not the own vehicle and the external apparatus are in an approaching relationship. In other words, the approaching determination unit is able to determine whether or not the own apparatus and the external apparatus are in an approaching relationship, based on a determination whether or not the double difference tends to decrease.

The double difference used for determining the approaching relationship can be identified as long as two reference stations are present, being commonly captured by the own apparatus and the external apparatus.

Usable reference stations includes satellites used for the Global Navigation Satellite System (hereinafter referred to as the GNSS satellites) or a radio base station which composes a public mobile communication network such as cellular phone network.

Even in the case where the GNSS satellites are employed as reference stations, because of the above-mentioned reason, the own apparatus and the external apparatus may commonly capture only two GNSS satellites. In other words, even when the number of captured satellites is less than or equal to three, the external apparatus communicating with the own apparatus through a wireless communication can determine whether or not the external apparatus and the own apparatus is in an approaching relationship.

A pseudo range information transmitting apparatus is used in a mobile body. The apparatus includes: a receiver receiving radio waves including sender information of a sender which transmits the radio waves, the radio waves being transmitted from a plurality of reference stations each being present in different locations; a pseudo range identifying unit determining a captured reference station from which the radio waves are received among the plurality of reference stations, and successively identifying a pseudo range to the captured reference station based on the radio waves received by the receiver and transmitted from the captured station; and a transmission unit transmitting a pseudo range associated information into surrounding the mobile body by a wireless communication. The pseudo range associated information is determined depending on the pseudo range identified by the pseudo range identifying unit, for each of a predetermined three captured reference stations, when three or more captured reference stations are present.

The pseudo range information transmitting apparatus provided with the above-described configuration is an apparatus focusing a function of transmitting own pseudo range associated information in the above-described collision determination apparatus. Therefore, the pseudo range information transmitting apparatus having the above-described configuration performs an inter-vehicle communication with the above-described collision determination apparatus (i.e., cooperative work), similar effects and advantages of the collision determination apparatus can be obtained.

DETAILED DESCRIPTION OF PREFERRED EMBODIMENTS

Figure 1:
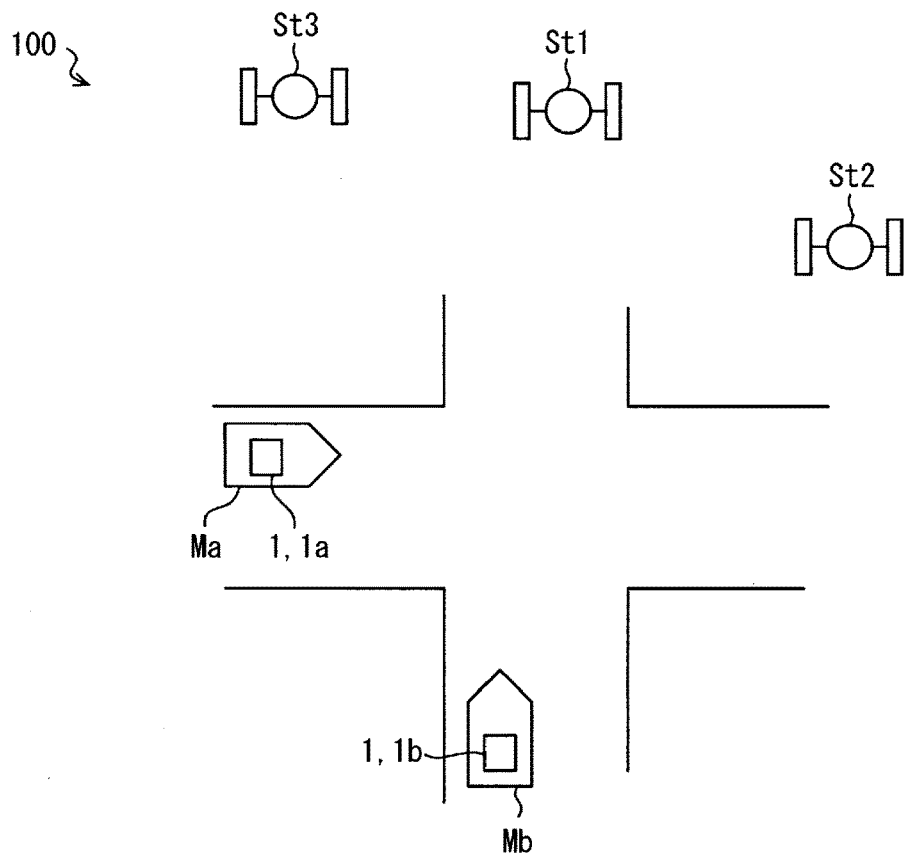
FIG. 1 is an overall configuration of a driving support system according to the present embodiment.

Hereinafter, with reference to drawings, embodiments of the present disclosure will be described. FIG. 1 is a diagram showing an example of an overall configuration of a driving support system using a collision determination apparatus according to the present disclosure. As shown in FIG. 1, the driving support system 100 is provided with a plurality of GNSS satellites St1 to St3, and a plurality of on-vehicle units 1 mounted on each of a plurality of vehicles Ma and Mb.

In FIG. 1, for convenience, only two vehicles each having the on-vehicle unit 1 are shown. However, three or more vehicles can be present. Hereinafter, to identify respective on-vehicle units 1 mounted on the vehicles Ma and Mb, the on-vehicle unit 1 mounted on the vehicle Ma is also referred to as an on-vehicle unit 1a, and the on-vehicle unit 1 mounted on the vehicle Mb is also referred to as an on-vehicle unit 1b. Moreover, when identifying the vehicles Ma and Mb, a first vehicle Ma and a second vehicle Mb are used respectively. The on-vehicle unit 1a corresponds to the collision determination apparatus recited in the claims and the on-vehicle unit 1b corresponds to external apparatus recited in the claims.

Only 3 GNSS satellites are shown in FIG. 1 for convenience reason, however, 4 or more satellites may be present. When it is not required to discern the GNSS satellites St1 to St3, these satellites are simply described as a GNSS satellite. The GNSS satellite corresponds to reference station recited in the claims.

<Overall Configuration of Driving Support System 100>

The GNSS satellites St1 to St3 are used for the Global Navigation Satellite System, i.e., GNSS. Respective GNSS satellites St1 to St3 transmits radio waves including data indicating current location of the satellite (so-called ephemeris). The radio waves transmitted by the satellites St1 to St3 include time information at which corresponding GNSS satellite transmitted the radio waves. Each of the satellites St1 to St3 transmits a signal in which phase modulation is applied based on an own C/A code included in each of the GNSS satellites. The C/A code corresponds to sender information recited in the claims.

Every GNSS satellites St1 to St3 are present in a location where the vehicles Ma and Mb can receive the radio waves transmitted from the corresponding GNSS satellite. In other words, all of the GNSS satellites St1 to St3 are captured by the vehicles Ma and Mb. It should be noted that a state where a vehicle can capture a satellite is referred to as a state where the vehicle has received the radio waves from the GNSS satellite.

The vehicle Ma and the vehicle Mb are vehicles which run on the road. According to the embodiments, the vehicles Ma and Mb are four wheel drive vehicles. However, the vehicles are not limited to four wheel vehicles but can be two wheel vehicles or three wheel vehicles. The two wheel vehicles may include an engine-equipped bicycle.

The vehicles Ma and Mb have a function for receiving radio waves transmitted from the GNSS satellites St1 to St3. Also, the vehicles Ma and Mb are configured to perform a wireless communication without using broadband communication network, i.e., so-called inter-vehicle communication, by using radio waves in a pre-allocated frequency range. The frequency range used for the inter-vehicle communication may appropriately be designed. For example, the inter-vehicle communication can be achieved using 760 MHz band radio waves. Needless to say, the inter-vehicle communication may be designed using radio waves in frequency ranges such as 2.4 GHz or 5.9 GHz.

It should be noted that the on-vehicle unit 1 provides the function for receiving radio waves transmitted from the above-described GNSS satellites St1 to St3, or the function for the inter-vehicle communication. Detailed configuration of the on-vehicle unit 1 mounted on respective vehicles will be described as follows.

<Configuration of On-Vehicle Unit 1>

Figure 2:
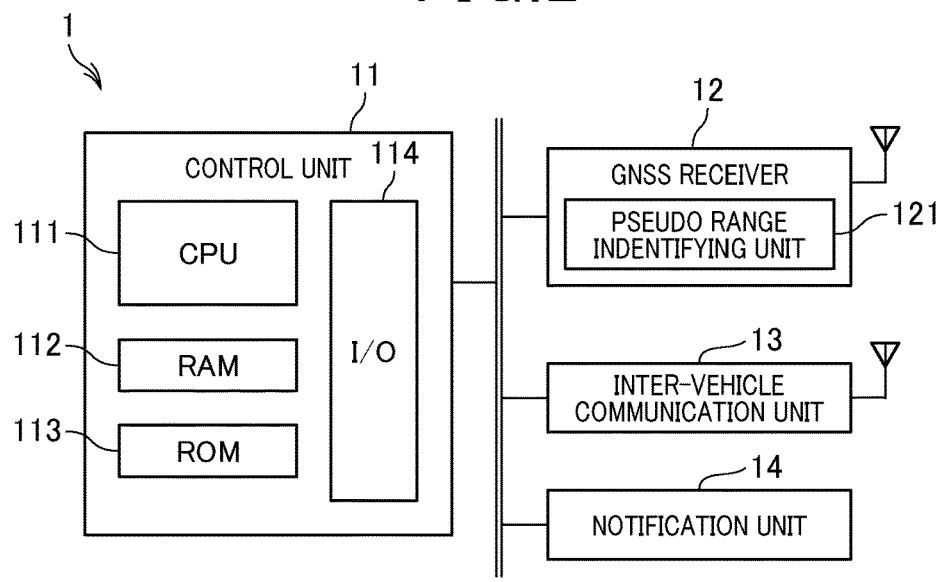
FIG. 2 is a block diagram showing an overall configuration of an on-vehicle unit.

As shown in FIG. 2, the on-vehicle unit 1 is provided with a control unit 11, a GNSS receiver 12, an inter-vehicle communication unit 13 and a notification unit 14. The control unit 11 is communicably connected to the GNSS receiver 12, the inter-vehicle communication unit 13 and the notification unit 14. For the convenience, a vehicle provided with the on-vehicle unit 1 is also referred to as the own vehicle so as to distinguish from vehicles provided with other on-vehicle unit 1.

The control unit 11 controls overall operation of the on-vehicle 1. The control unit 11 is configured of an ordinal computer, including CPU 111, RAM 112, ROM 113, I/O 114 and a bus-line which mutually connects these devices. The ROM 113 stores programs such as a program having the ordinal computer serve as a control unit 11 (hereinafter referred to as a control program).

The above-described control program may be stored in a non-transitory tangible storage medium. The CPU 111 executes the control program. The execution of the control program is referred to as an execution of methods corresponding to the control program.

The control unit 11 determines, based on data transmitted from the GNSS receiver 12 or the inter-vehicle communication unit 13, whether or not the other vehicle which has communicated with the own vehicle is in a positional relationship with the own vehicle, which is likely to cause a collision with the own vehicle. When the control unit determines that other vehicle is likely to cause a collision with the own vehicle, the notification unit 14 can be operated in a predetermined manner, thereby warning the driver of the own vehicle to pay attention to the other vehicle. The detailed configuration and operation of the control unit 11 will be described later.

The GNSS receiver 12 receives radio waves transmitted from the GNSS satellites. In the case where the GNSS receiver captures 4 or more GNSS satellites, the GNSS receiver receives information indicating the current location of the GNSS receiver 12, based on the received radio waves transmitted from the GNSS satellites. As for the coordinate system used for expressing the current location acquired by the GNSS receiver 12, for example, three-dimensional coordinate system commonly used in a positional measurement with the GNSS satellite can be used. For example, a geodetic coordinate system may be used as the three-dimensional coordinate system, where the current location is expressed by latitude, longitude, and altitude. Alternatively, an ECEF (Earth Centered, Earth Fixed) orthogonal coordinate system or horizontal orthogonal coordinate system may be used.

As a sub function to identify the current location, the GNSS receiver 12 is provided with a pseudo range identifying unit 121 which identifies a pseudo range between the GNSS receiver 12 and a GNSS satellite which has been captured (hereinafter po to as captured satellite). The pseudo range identifying unit 121 successively calculates, based on the received radio waves, the pseudo range between the GNSS receiver 12 and the GNSS satellite for every captured GNSS satellite.

A known method can be utilized for calculating the pseudo range. For example, the pseudo range identifying unit 121 multiplies the difference between a reception time of the radio waves and a transmission time of the radio waves by propagation speed c ($c=3\times10^8$ of the radio waves [m/sec]) to calculate the pseudo range. It should be noted that the transmission time is included in the received radio waves. The reception time may be identified with time information included in the GNSS receiver 12.

As an example, according to the embodiment, the pseudo range identifying unit 121 determines the difference between the transmission time and the reception time to be a time of flight (i.e., TOF) of the radio waves to calculate the pseudo range. However, any calculation methods can be used to calculate the TOF. The pseudo range identifying unit 121 may identify the TOF based on an amount of phase shift of the C/A code.

The pseudo range identifying unit 121 successively sends data representing the pseudo range corresponding to every captured satellite to the control unit 11. The pseudo range corresponding to every satellite is correlated with information indicating which satellite the pseudo range belongs to (hereinafter satellite identification information) and is sent to the control unit 11. The sender of the received radio waves, i.e., the captured satellite may be identified by a C/A code of the received radio waves. The GNSS receiver 12 corresponds to receiver recited in the claims. Also, the captured satellite corresponds to captured reference station recited in the claims.

The inter-vehicle communication unit 13 is provided with an antenna capable of transmitting/receiving radio waves in a frequency range used for the inter-vehicle communication so as to perform a wireless (radio) communication directly with other on-vehicle unit 1 via the antenna. Specifically, the inter-vehicle communication unit 13 performs predetermined processes including analog-digital conversion, demodulation and decoding, thereby extracting data included in the reception signal and outputting the extracted data to the control unit 11. Further, the inter-vehicle communication unit 13 outputs an analog signal to the antenna to be radiated as radio waves. The analog signal is obtained through prescribed processes applied to the received data from the control unit 11, including encoding/modulating/digital to analog converting.

The notification unit 14 notifies passengers in the own vehicle about predetermined information. The notification unit 14 may includes a display, an indicator, a speaker, and a vibration generating unit (i.e., vibrator). When the vibrator is used as the notification unit 14, the vibrator may preferably be disposed at a position to which body of the driver contacts, such as a driver's seat and a steering wheel. The notification unit 14 operates based on the control unit 11.

<Configuration of Control Unit 11>

Hereinafter, a configuration and an operation of the control unit 11 will be described with an example of the control unit 11 in the on-vehicle unit 1a mounted on the first vehicle Ma. The control unit 11 in the on-vehicle unit 1 has the same configuration as the on-vehicle unit 1a.

Figure 3:
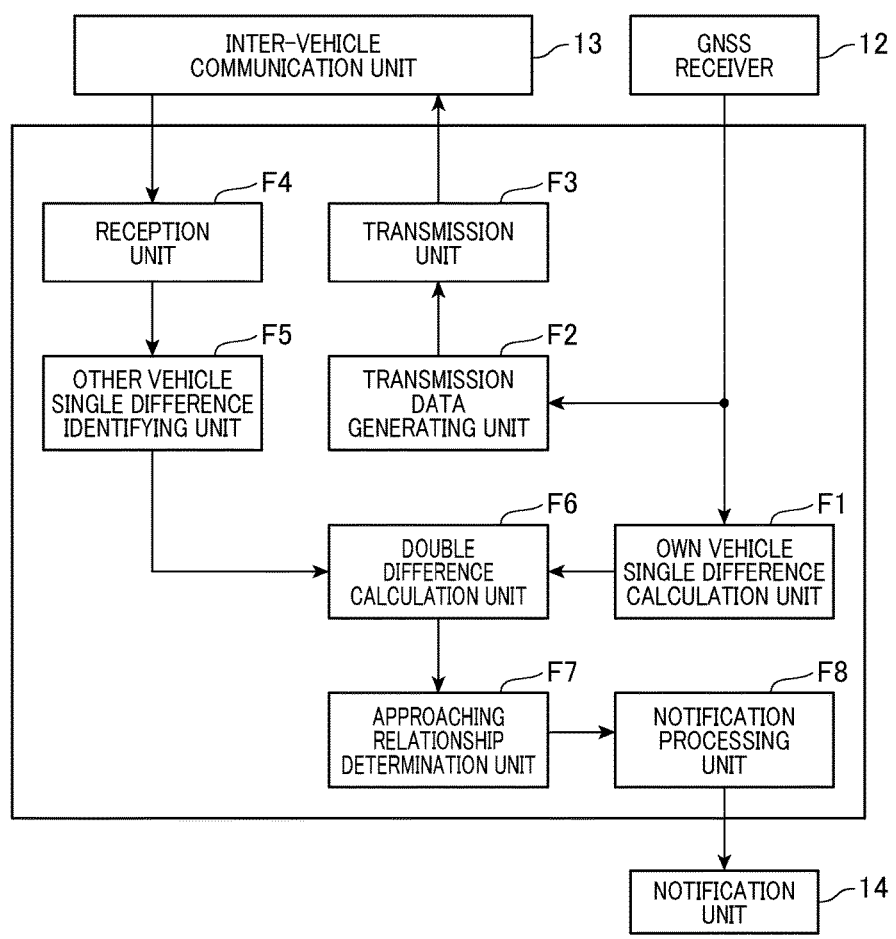
FIG. 3 is a block diagram showing an example of an overall configuration of a control unit.

The CPU 111 included in the control unit 11 executes the above-described control program, whereby the control unit 11 provides various functions shown in FIG. 3. The control unit 11 is provided with function blocks including an own vehicle single difference calculation unit F1, a transmission data generating unit F2, a transmission unit F3, a reception unit F4, a other vehicle single difference identifying unit F5, a double difference calculation unit F6, an approaching relationship determination unit F7, and a notification processing unit F8.

It should be noted that a part or all of the functional blocks included in the control unit 11 may be configured as hardware circuits such as single or a plurality of ICs. A part or all of the function blocks includes in the control unit 11 may be configured as a combination of software where CPU executes corresponding programs, and hardware units.

The own vehicle single difference calculation unit F1 acquires a pseudo range for every captured satellite successively sent from the GNSS receiver 12. Then, the own vehicle single difference calculation unit F1 successively (e.g., every 100 msec) calculates a single difference for every combination, i.e., a pair of satellite composed of 2 GNSS satellites. The single difference is defined as an absolute value of the difference between the pseudo ranges from the GNSS satellites composing the combination. Hereinafter, a combination of any 2 GNSS satellites is also referred to as a satellite combination.

For example, as shown in FIG. 1, when the first vehicle Ma has captured 3 GNSS satellites St1 to St3, 3 possible combination satellites includes GNSS satellites St1 and St2, GNSS satellites St1 and St3, GNSS satellite St2 and St3. In this case, the own vehicle single difference calculation unit F1 calculates the single difference for every three satellite combinations. More specifically, the single difference in the combination of the GNSS satellite St1 and the GNSS satellite St2 is defined as an absolute value of the difference between the pseudo range from the GNSS satellite St1 and the pseudo range St2 of the GNSS satellite. The GNSS satellite St1 corresponds to an example of first reference station recited in the claims and the GNSS satellite St2 corresponds to second reference station recited in the claims.

The single difference for every satellite combination successively calculated by the own vehicle single difference calculation unit F1 is stored into the RAM 112. The single difference stored in the RAM 112 is referred by the double difference calculation unit F6. It should be noted that the single difference for every satellite combination is used together with information (hereinafter referred to as pair information) indicating which satellite combination corresponds to the single difference. The own vehicle single difference calculation unit F1 corresponds to self-single difference calculation unit recited in the claims. The single difference calculated by the own vehicle single difference calculation unit F1 corresponds to the self single difference recited in the claims.

The transmission data generating unit F2 generates transmission data (hereinafter referred to as inter-vehicle communication data) to be transmitted to other vehicle through the inter-vehicle communication. The transmission data generation unit F2 generates, as inter-vehicle communication data, data (hereinafter referred to as pseudo range data) indicating a pseudo range for every captured satellite sent by the GNSS receiver 12

In the pseudo range data, the pseudo range of every captured satellite is correlated with its satellite identification information (satellite ID). Thus, other on-vehicle unit 1 (e.g., on-vehicle 1b) which receives the pseudo range data can identify the satellite captured by the first vehicle Ma, and a pseudo range from captured satellites of the first vehicle Ma.

The pseudo range data includes a vehicle ID representing an on-vehicle unit 1 of the sender in addition to the pseudo range and the satellite ID information for every captured satellite. The vehicle ID is identification information allocated for every communication terminal (i.e., on-vehicle unit) performing inter-vehicle communication. The vehicle ID of the first vehicle Ma is included in the pseudo range data as the sender address. The pseudo range data corresponds to pseudo range pseudo range associated information recited in the claims.

The data (e.g., pseudo range data) generated by the transmission data generating unit F2 is successively sent to the transmission unit F3. The transmission unit F3 outputs the data sent by the transmission data generating unit F2 to the inter-vehicle communication unit 13 so as to allow the communication unit 13 to transmit the data by wireless communication.

The reception unit F4 acquires data received by the inter-vehicle communication unit 13. For example, the reception unit F4 acquires pseudo range data transmitted from other vehicles (e.g., second vehicle Mb). The reception unit F4, when the pseudo range data is acquired, sends the acquired pseudo range data to the other vehicle single difference identifying unit F5. The pseudo range data acquired by the reception unit 4 is stored into the RAM 112 such that the data is stored to be identifiable for every vehicle as a sender which sends the pseudo range data. The sender of the reception data may be identified by a sender address included in the data.

The other vehicle single difference identifying unit F5 calculates single difference for every GNSS satellite combination captured by the other vehicle, based on the pseudo range data of the other vehicle sent by the reception unit F4, using the same method as the own vehicle single difference calculation unit F1. In other words, the other vehicle single difference identifying unit F5 identifies the single difference for every satellite combination in the other vehicle based on the pseudo range data transmitted from the other vehicle.

For example, the other vehicle single difference identifying unit F5 calculates a single difference for every satellite combination of the second vehicle Mb based on the pseudo range data received from the second vehicle Mb. In the case where pseudo range data is received from a plurality of other vehicles, the single difference is calculated for every other vehicle.

The single difference for every satellite combination in any other vehicle is stored into the RAM 112 such that the data is stored to be discerned for every vehicle, where the single difference is calculated by the other vehicle single difference identifying unit F5. Hereinafter, for the convenience, the single difference calculated by the own vehicle single difference calculation unit F1 is also referred to as the own vehicle single difference, and the single difference identified by the other vehicle single difference identifying unit F5 is also referred to as other vehicle single difference. The other vehicle single difference identifying unit F5 corresponds to external single difference identifying unit recited in the claims, and the other vehicle single difference corresponds to the external single difference recited in the claims.

Similar to the own vehicle single difference, the other vehicle single difference is stored into the RAM 112 correlating with a pair information indicating a satellite combination corresponding to the single difference. The data showing the own vehicle single difference or the other vehicle single difference may preferably has a time stamp indicating a time at which these data are stored. The other vehicle single difference for every vehicle stored in the RAM 112 is referred by the double difference calculation unit F6.

Hereinafter, to simplify the description, a case is assumed where the first vehicle Ma performs inter-vehicle communication only with the second vehicle Mb, and operations for the respective units will be described.

The double difference calculation unit F6 refers data indicating own vehicle single difference for every satellite combination and data indicating other vehicle single difference for every satellite combination which are stored in the RAM 112, and identifies GNSS satellite which are captured commonly by both of the first vehicle Ma and the second vehicle Mb. Then, the double difference calculation unit F6 successively (e.g., every 100 msec) calculates the double difference D for every satellite combination which is commonly captured by the first vehicle Ma and the second vehicle Mb. The double difference D is defined as an absolute value of the difference between the own vehicle single difference and the other vehicle single difference in the same satellite combination.

For example, defining the single difference of the first vehicle Ma in the satellite combination of the GNSS satellites St1 and St2 is d (a, St2, St2), and the single difference of the second vehicle Mb in the same satellite combination is d (b, St1, St2), the double difference D (a, b, St1, St2) between the first vehicle Ma and the second vehicle Mb in the satellite combination of the GNSS St1 and St2 is expressed as the following equation (1).

$$D(a,b,St1,St2)=|d(a,St1,St2)-d(b,St1,St2)| \quad (1)$$

Also, defining the pseudo range between the first vehicle Ma and the GNSS satellite St1 is Pd (a, St1), the pseudo range between the first vehicle Ma and the GNSS satellite St2 is Pd (a, St2), the pseudo range between the second vehicle Mb and the GNSS satellite St1 is Pd (b, St1), and the pseudo range between the second vehicle Mb and the GNSS satellite St2 is Pd (b, St2), the double distance D (a, b, St1, St2) expressed in the equation (1) can be expressed as the following equation (2)

$$D(a,b,St1,St2)=\|Pd(a,St1)-Pd(a,St2)|-|Pd(b,St1)-Pd(b,St2)\| \quad (2)$$

The double difference D (a, b, St1, St2) between the first vehicle Ma and the second vehicle Mb calculated from the above-described equations for the satellite combination of the GNSS satellites St1 and St2, is substantially proportional to the relative distance between the first vehicle Ma and the second distance Mb, and becomes 0 when the first vehicle Ma and the second vehicle Mb are at the same location. In other words, the double difference D between the first vehicle Ma and the second vehicle Mb for the every common satellite combination serves as an index of the distance between the first vehicle Ma and the second vehicle Mb.

In the case where the number of captured satellites of each vehicle is 3 or less, or almanac data has not been acquired, the time information in the respective vehicles is asynchronous with respect to the reference time used for the GNSS satellite. Hence, each of the pseudo ranges of the vehicles has an error due to the time error. Here, parameters Pd (a, St1), Pd (a, St2) Pd (b, St1), Pd (b, St2) which compose the above equation (2) are expanded in the equations (3) to (6) below.

$$pd(a,St1)=\sqrt{(x_1-x_a)^2+(y_1-y_a)^2+(Z_1-Z_a)^2}+c(t_1-t_a) \quad (3)$$

$$pd(a,St2)=\sqrt{(x_2-x_a)^2+(y_2-y_a)^2+(Z_2-Z_a)^2}+c(t_2-t_a) \quad (4)$$

$$pd(b,St1)=\sqrt{(x_1-x_b)^2+(y_1-y_b)^2+(Z_1-Z_b)^2}+C(t_1-t_b) \quad (5)$$

$$pd(b,St2)=\sqrt{(x_2-x_b)^2+(y_2-y_b)^2+(Z_2-Z_b)^2}+C(t_2-t_b) \quad (6)$$

The parameters $x_1$, $y_1$, $z_1$ in the above-equations (3) to (6) are coordinates representing the current location of the GNSS satellite St1 in a predetermined three-dimensional coordinate system, and the parameters $x_2$, $y_2$, $z_2$ are coordinate representing the current location of the GNSS satellite St2 in the same coordinate system. The predetermined three-dimensional coordinate system may be set to a coordinate system used for the positioning of the GNSS satellites. The parameters $x_a$, $y_a$, $Z_a$ are coordinates showing the current location of the first vehicle Ma in the same coordinate system, and the parameters $x_b$, $y_b$, $Z_b$ are coordinates showing the current location of the second vehicle Mb. The parameters $t_1$, $t_2$ are time errors relative to the true values in the GNSS satellites St1 and St2 respectively, and the parameters $t_a$, $t_b$ are time errors relative to the true values in the first vehicle Ma and the second vehicle Mb. The second term in each of the equations represents a component due to the time error.

Substituting the above equations 3 to 6 for the equation 2, time error components included in various pseudo ranges are cancelled. That is, in the double difference D obtained through the above-described method, time errors with respect to the reference time of respective GNSS satellites and respective vehicles are cancelled.

Also, since the distance between the first vehicle Ma and the second vehicle Mb is within a distance (e.g., several hundreds of meters) enabling inter-vehicle communication, errors caused by the ionization layer or the troposphere are also cancelled with respect to the common GNSS satellite.

According to the double difference D calculated by the above-described method, an influence due to various errors is cancelled. As a result, the double difference D between the first vehicle Ma and the second vehicle Mb serves as an index accurately indicating the distance between the first vehicle Ma and the second vehicle Mb.

The double differences D with respect to the second vehicle Mb thus calculated by the double difference calculation unit F6 for every satellite combination are stored into the RAM 112. The calculation results at a plurality of time points may preferably be stored sequentially in time such that the latest calculation result is put at the top, and sorted by every satellite combination. For the convenience, data in which the double differences D are arranged sequentially in time for any satellite combination is referred to as time-sequence data of the double difference data D in the satellite combination.

In the case where a vehicle other than the second vehicle Mb is present in an area enabling the first vehicle to perform the inter-vehicle communication, similar to the second vehicle Mb, the double difference D may be calculated for the GNSS satellite combinations commonly captured by the first vehicle and other vehicle. The double difference D for the satellite combinations are calculated for every other vehicle and stored separately into the RAM 112. It should be noted that data having a predetermined period elapsed from a time of storing may be removed at any time.

The approaching relationship determination unit F7 determines whether or not the first vehicle Ma as the own vehicle and the second vehicle Mb is in a approaching relationship, based on a variation of the double difference D with time, relative to the second vehicle Mb calculated by the double difference calculation unit F6. The approaching relationship here represents that a mutual distance is likely to be decreased.

When the approaching relationship determination unit F7 determines that the first vehicle Ma and the second vehicle Mb are in an approaching relationship, the approaching relationship determination unit F7 further determines, by using the double difference in a predetermine satellite combination, whether or not the first vehicle Ma and the second vehicle Mb are likely to collide with each other within a predetermined time. When the approaching relationship determination unit F7 determines that the first vehicle Ma and the second vehicle Mb are likely to collide with each other within a predetermined time, the approaching relationship determination unit F7 requires the notification processing unit F8 to perform an alert process. The alert process notifies the driver in the own vehicle about a presence of a vehicle (second vehicle Mb in this case) likely to collide with the own vehicle. Detailed behavior of the approaching relationship determination unit F7 will be described later.

The notification processing unit F8 performs an alert process based on a requirement of the approaching relationship determination unit F7. For example, in the case where the on-vehicle unit 1 includes a display unit, the notification unit 8 displays an image on the display unit, showing a presence of a vehicle approaching the own vehicle. Also, in the case where the on-vehicle unit 1 includes speakers as the notification unit 14, the notification processing unit F8 may output sound of a predetermined message from the speakers, thereby alerting the driver about a presence of other vehicle in an approaching relationship. Further, vibrator may be vibrated with a predetermined vibration pattern or an indicator may be lit (or flashed), thereby alerting the driver about the presence of the other vehicle. The notification processing unit F8 may perform an alerting process using various notification devices which can be combined.

<Collision Determination Related Process>

With reference to the flowchart shown in FIG. 4, an alert necessity determination process performed by the approaching relationship determination unit F7 will be described. The alert necessity determination process is that the approaching relationship determination unit F7 determines whether or not the notification processing unit F8 performs an alert process for other vehicle (second vehicle Mb in this case) existing around the first vehicle Ma as an own vehicle. It should be noted that 'around the first vehicle Ma' is referred to as an area enabling an inter-vehicle communication.

Figure 4:
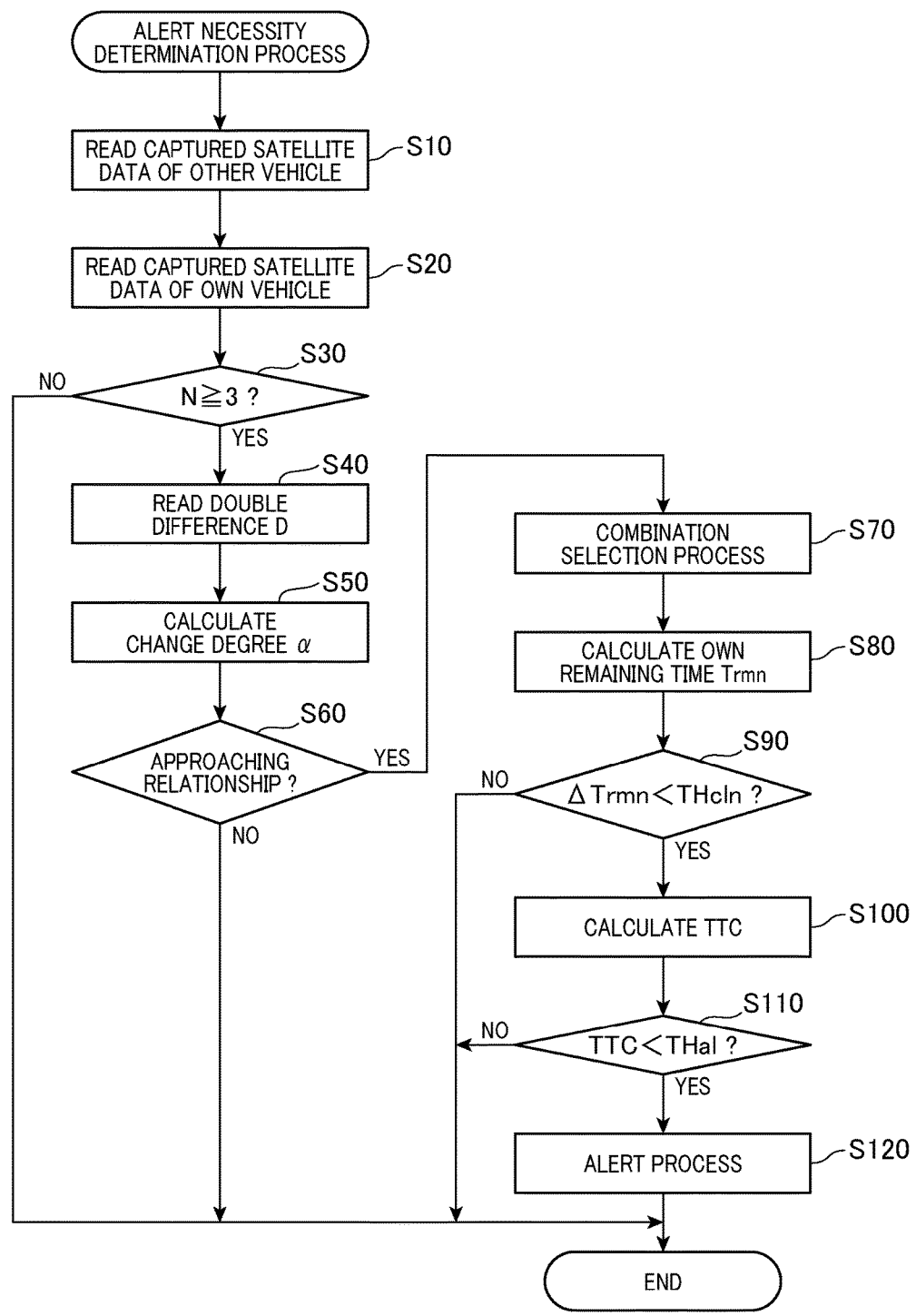
FIG. 4 is a flowchart showing an alert necessity determination process performed by approaching relationship determination unit.

Processes in the flowchart shown in FIG. 4 are successively performed (e.g., every 100 msec) while a power source for traveling (e.g., ignition power source) of the first vehicle Ma is turned ON so as to supply power to the on-vehicle unit 1a.

At step S10, the process refers to the RAM 112 and identifies captured satellites of the second vehicle Mb and proceeds to step S20. At step S20, process refers to the RAM 112 and identifies captured satellites of the first vehicle Ma and proceeds to S30.

At step S30, process determines whether or not the number of GNSS satellites N captured by the first vehicle Ma and the second vehicle Mb (the number of common captured satellites) is 3 or more. When the number of common captured satellites N is 3 or more, step S30 is determined as affirmative and proceeds to step S40. On the other hand, when the number of common captured satellites N is 2 or less, the process determines step S30 as negative and terminates processes.

In step S40, the process reads, from the RAM 112, the time-sequence data of the double difference for every satellite combination of the second vehicle Mb, and proceeds to step S50. According to the present embodiment, separately from processes in the above-described flowchart, the double difference calculation unit F6 calculates the double difference D for every satellite combination of the second vehicle Mb, every time when the pseudo range data is received from the second vehicle Mb. However, it is not limited to these processes and any other processes can be used. As another aspect of processes, the double difference calculation unit F6 may calculate, at a time when process proceeds to step S40, the double difference D for every satellite combination of the second vehicle Mb at the last several time points.

Figure 5:
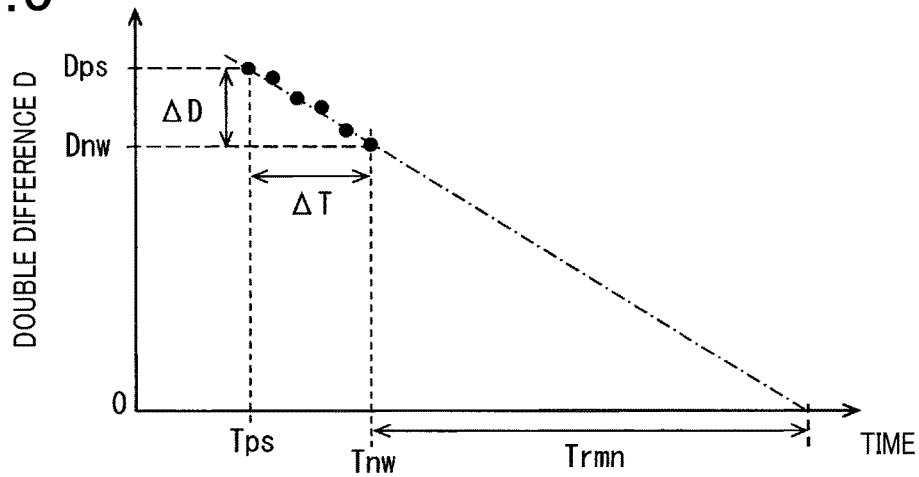
FIG. 5 is a graph showing a relationship between double difference D and variability α.

In step S50, a degree of change α per time unit (hereinafter referred to as change degree) of the double difference D for every satellite combination is calculated based on the data read at step S40. FIG. 5 is a graph conceptually showing a change of the double difference D with time in a satellite combination, in the case where the first vehicle Ma and the second vehicle Mb are in an approaching relationship. The horizontal axis represents time and the vertical axis represents the value of the double difference D. The time Tnw provided on the horizontal axis indicates a time point at which the latest double difference D is calculated, and the time point Tps indicates a past time going back from the time Tnw for a certain time (Δt shown in FIG. 5). Dnw indicates a value of the double difference D at time point Tnw, and Dps indicates a value of the double difference D at time point Tps. It should be noted that black dots in the graph represent double difference calculated at each time point.

In this case, the approaching relationship determination unit F7 subtracts Dps from Dnw to calculate ΔD, and ΔD is divided by ΔT, thereby identifying the change degree α in the satellite combination. It should be noted that ΔT is an absolute value, and ΔD is negative value when the double difference D decreases. In other words, the sign of the change degree α is negative when the double difference D tends to decrease.

Accordingly, the change degree α serves as a parameter representing whether or not the double difference D is likely to decrease such that the double difference D rapidly decreases as the change degree α becomes smaller. A dashed line shown in FIG. 5 shows a linear function where a relationship between an elapse time and a double difference D is approximated, defined in a population of double differences D within a certain period of time from a past time point to the current time.

The double difference D of the second vehicle Mb is proportional to the distance between the first vehicle Ma and the second vehicle Mb as described above. Therefore, in the case where the change degree α of the double difference D of the second vehicle Mb is negative, the distance between the first vehicle Ma and the second vehicle Mb is likely to decrease.

When the calculation of the change degree α for all satellite combinations is completed at step S50, process proceeds to step S60. In step S60, process determines whether or not the first vehicle Ma and the second vehicle Mb is in an approaching relationship, based on the change degree for every satellite combination calculated in step S50. Specifically, the approaching relationship determination unit F7 determines that an approaching relationship exists between the first vehicle Ma and the second vehicle Mb, when the change degrees a in respective satellite combinations are negative values. In other words, when all of the double differences D in respective satellite combination are likely to decrease, process determines that the first vehicle Ma and the second vehicle Mb are in an approaching relationship.

It should be noted that whether or not the double difference D in a satellite combination is determined using a parameter other than the change degree α. For example, when ΔD is negative value, process may determine that the double difference D in the satellite combination is likely to decrease.

The calculating method of calculating the change degree α is not limited to the above-described method. For example, double distance acquired in a certain period from a past time point to the current time is extracted as a population, and an approximate line is obtained by applying a known statistical analysis method such as least square method to the population, and then a change degree α can be detected as an inclination of the approximate line.

As an example of the present embodiment, an approaching relationship is determined when the double differences D in all satellite combinations are likely to decrease. However, it is not limited to this method to determine an approaching relationship. For example, an approaching relationship between the first vehicle Ma and the second vehicle Mb may be determined when the number of satellite combinations where the double differences D are likely to decrease, is larger than the number of satellite combinations where the double differences D are not likely to decrease. In other words, a majority rule may be used to determine whether or not the first vehicle Ma and the second vehicle Mb are in an approaching relationship.

As another aspect of the embodiment, the approaching relationship determination unit F7 may determine that the first vehicle Ma and the second vehicle Mb are in an approaching relationship, when the double difference D in any one of satellite combination is likely to decrease.

However, because of the following reason, a presence of an approaching relationship between the first vehicle Ma and the second vehicle Mb may preferably be determined based on change degrees a of the double differences in at least 2 or more satellite combinations (e.g., 2 pairs of combinations).

As described, the double distance D in any satellite combination serves as an index of the distance between the first vehicle Ma and the second vehicle Mb. Specifically, when the first vehicle Ma and the second vehicle Mb are in an approaching relationship, the double differences D is likely to decrease.

However, in the case where the double difference is 0, the first vehicle Ma and the second vehicle Mb are not necessarily present at the same location. Mathematically, even when the first vehicle Ma and the second vehicle Mb are apart from each other, the double difference sometimes may become 0. In other words, even when the double difference D is likely to decrease in a satellite combination, the first vehicle Ma and the second vehicle Mb is not necessarily in an approaching relationship.

Accordingly, a condition is set to determine the approaching relationship between the first vehicle Ma and the second vehicle Mb, where all of the double differences D in a plurality of satellite combinations are likely to decrease. Hence, miss-determination due to the above-described phenomenon can be minimized. Apparently, in the case where the design architecture of the driving support system 100 tolerates the miss-determination due to the above-described phenomenon, an approaching relationship between the first vehicle Ma and the second vehicle Mb may be determined when the double difference D of any one of satellite combinations is likely to decrease.

When an approaching relationship is determined between the first vehicle Ma and the second vehicle Mb at step S60, process proceeds to step S70. When no-approaching relationship is determined between the first vehicle Ma and the second vehicle Mb, process terminates the procedure.

At step S70, a combination selection process is performed and proceeds to step S80. The combination selection process selects, from a plurality of satellite combinations, 2 satellite pairs used for a determination whether or not the first vehicle Ma and the second vehicle Mb are likely to collide with each other within a predetermined time (hereinafter referred to as collision determination).

In the present embodiment, as an example, a satellite combination having the largest absolute value of the change degree α and a satellite combination having the second largest combination are selected. Considering the change degree α is a negative value, the step S70 corresponds to a process that selects a satellite combination having the smallest change degree α and a satellite combination having the second smallest change degree α. Selection rule of selecting the satellite combination in the combination selection process is not limited to the above-mentioned rule. For example, 2 pairs of satellite combinations used for collision determination may be selected with methods in various modifications which will be described later.

The reason why the 2 pairs of satellite combinations are used for the collision determination is to improve accuracy of the determination. In other words, a plurality of satellites are combined so as to minimize influence of an error inherent in the satellite combination. The 2 pairs of satellites are used to perform the collision determination according to the present embodiment. However, any other satellite combinations are available. For example, 3 or more satellite combinations may be used to perform collision determination. Also, one pair of satellite combination may be used to perform collision determination.

Hereinafter, one satellite combination in the selected 2 satellite combinations at step S70 is also referred to as a first satellite combination, and the other satellite combination is also referred to as a second satellite combination. The first satellite combination may be selected as a design, from the 2 satellite combinations selected at step S70. As an example, a satellite combination having the largest absolute value of the change degree α is determined as the first combination. The first satellite combination corresponds to the first combination recited in the claims. The second satellite combination corresponds to second combination recited in the claims.

At step S80, for every selected satellite combination selected at step S70, own remaining time Trmn is calculated with the change degree α in the selected satellite combination. The own remaining time Trmn is a remaining time until the double difference D of the satellite combination to becomes 0. For example, the own remaining time Trmn in the first satellite combination is determined such that the latest double difference D in the first satellite combination is divided by the change degree α in the first satellite combination. It should be noted that the concept of the own remaining time Trmn is also shown in FIG. 5.

When the own remaining time Trmn of the first satellite combination and the own remaining time Trmn of the second satellite combination are completed, process proceeds to step S90. For the convenience, the own remaining time Trmn of the first satellite combination is also referred to as a first own remaining time Trmn1, the own remaining time Trmn of the second satellite combination is also referred to as a second own remaining time Trmn2.

The first own remaining time Trmn1 corresponds to first remaining time recited in the claims, and the second own remaining time Trmn2 corresponds to the second remaining time recited in the claims. The change degree α of the first satellite combination corresponds to the first combination change degree recited in the claims, and the change degree α of the second satellite combination corresponds to the second combination change degree recited in the claims.

At step S90, process determines whether or not ΔTrmn which is an absolute value of the difference between the first own remaining time Trmn1 and the second own remaining time Trmn2 (hereinafter referred to as remaining time difference) is less than a predetermined collision threshold THcln. When the remaining time difference ΔTrmn is less than the collision threshold THcln, step S90 is determined as affirmative and the process proceeds to step S100. When the remaining time difference ΔTrmn is the collision threshold THcln or more, step S90 is determined as negative and process terminates the procedure.

The collision threshold THcln is used for determining, based on the difference between the first own remaining time Trmn1 and the second own remaining time Trmn2, whether or not the relative position is changed at a timing where the first vehicle Ma and the second vehicle Mb collide with each other.

Assuming the first vehicle Ma and the second vehicle Mb do not collide with each other, the times until respective double differences D become 0 (i.e., own remaining time Trmn) differs from each other. Paradoxically, when the first vehicle Ma and the second vehicle Mb collide with each other, the respective own remaining times Trmn have to be substantially the same.

Accordingly, depending on whether or not the remaining time difference ΔTrmn is less than the collision threshold THcln, determination can be made whether or not the first vehicle Ma and the second vehicle Mb would possibly collide with each other. In the case where the remaining time difference ΔTrmn is the collision threshold THcln or more, the first vehicle Ma and the second vehicle Mb are in an approaching relationship, however a positional relationship and a relative speed thereof do not cause collision. In other words, determination at step S90 corresponds to the above-described collision determination. It should be noted that specific value of the collision threshold THcln may be appropriately designed, for example, 3 seconds or 5 seconds.

At step S100, process calculates, based on the first own remaining time Trmn1 and the second own remaining time Trmn2 a remaining time to collision between the first vehicle Ma and the second vehicle Mb (hereinafter referred to TTC: Time to Collision) and proceeds to step S110. As an example, the TTC is defined as an average value of the first own remaining time Trmn1 and the second own remaining time Trmn2. When a collision determination is performed with 3 or more satellite combinations for example, a median value of the own remaining time in a plurality of satellite combinations may be utilized as a TTC.

At step S110, the process determines whether or not the TTC calculated at step S110 is less than a predetermined alert period THal. When the TTC is less than the predetermined alert period THal, step S110 is determined as affirmative and process proceeds to step S120. When the TTC is the alert period THal or more, step S110 is determined as negative and the process terminates the procedure. The alert period THal may be designed appropriately to set from 5 sec to 10 sec, for example.

At step S120, process requires the notification processing unit F8 to perform an alert process, and then terminates the procedure. The notification processing unit F8 performs the alert process in cooperation with the notification unit 14, in accordance with a requirement of the approaching relationship determination unit F7.

<Summary of Present Embodiment>

According to the above-described configuration, the approaching relationship determination unit F7 determines, based on the double differences between the first vehicle Ma as the own vehicle and the second vehicle Mb, for every satellite combination, whether or not the first vehicle Ma and the second vehicle Mb are in an approaching relationship. When the approaching relationship determination unit F7 determines an approaching relationship, the approaching relationship determination unit F7 calculates the TTC based on the double difference D, and determines whether or not the alert process is required, based on the TTC value.

The double difference D used in the embodiment is identified using the GNSS satellites commonly captured by the first vehicle Ma and the second vehicle Mb, and pseudo range between the satellites and the respective vehicles. To determine, the approaching relationship, a double difference D of at least one pair of satellites may be identified.

To calculate the double difference D in a pair of satellite, 2 GNSS satellites commonly captured by the first vehicle Ma and the second vehicle Mb are required. Therefore, according to the above-described configuration, even when the number of satellites captured by at least either the first vehicle Ma or the second vehicle Mb is 3 or less, the on-vehicle unit 1a of the first vehicle Ma is able to determine, without a positioning process, whether or not the second vehicle Mb performing the inter-vehicle communication with the own vehicle is in an approaching relationship with the own vehicle.

To more accurately determine whether or not the first vehicle Ma and the second vehicle Mb is in an approaching relationship, double differences D in 2 pairs of satellite combinations are required. To calculate the double differences D in the 2 pairs of satellite combinations, 3 GNSS satellites are commonly captured by the first vehicle Ma and the second vehicle Mb.

Accordingly, as long as the first vehicle Ma and the second vehicle Mb commonly capture 3 GNSS satellites, whether or not an approaching relationship is present between the first vehicle Ma and the second vehicle Mb can be determined more accurately. In other words, even when 3 satellites are captured, without a positioning process, a vehicle in an approaching relationship with the own vehicle can be determined more accurately.

According to the above-described embodiments, the own remaining time Trmn is calculated from the double difference D for respective 2 pairs of satellite combinations, and TTC is identified from the 2 own remaining time Trmn. According to such an aspect, the TTC can be identified without estimating traveling speed and traveling direction in each of the first vehicle Ma and the second vehicle Mb.

Specifically, in the determination process whether or not the first vehicle Ma and the second vehicle Mb are likely to collide with each other within a predetermined time, traveling speed, traveling direction and current location in each vehicle are not necessary. Also, since the TTC can be obtained from the change degree $\alpha$ of the double difference D, an amount of calculation (i.e., CPU processing load) to calculate the TTC can be reduced compared to conventionally-used method.

As described, according to aspect of the embodiment, as satellite combinations used for collision determination, satellite combinations each having large absolute value of the change degree $\alpha$ are preferentially selected. According to such an aspect, errors inherent in the TTC can be minimized.

Specifically, it is considered that errors due to pseudo ranges may be included in the current double difference D. The current double difference D is divided by the change degree $\alpha$ to obtain the own remaining time Trmn. In other words, the own remaining time Trmn includes components due to errors in the double difference D.

When assuming the errors included in the double difference are constant, the smaller the change degree $\alpha$, the larger an amount of error which reflects to the own remaining time. Hence, in the case where an absolute value of the change degree $\alpha$ is relatively small, errors due to errors in the double difference D become large, compared to a case where the change degree $\alpha$ is relatively large.

Taking the above-mentioned issues into consideration, according to the present embodiment, a satellite combination having large absolute value of the change degree $\alpha$ is selected first. Thus, an amount of errors included in the double difference D is prevented from reflecting to the own remaining time Trmn. Apparently, the smaller an amount of errors included in the own remaining time Trmn, the more accurate TTC can be calculated. In other words, the above-described configuration can improve an accuracy of estimating TTC.

In the case where the apparatus is firstly activated or has not been activated for a long period of time (i.e., so-called cold start), it takes time to acquire almanac data from the GNSS satellite. Specifically, when the GNSS receiver 12 is activated as a cold start, a disabling period of positioning process continues for a predetermined period. It should be noted that the time required for acquiring the almanac data depends on reception state of radio waves from the GNSS satellite.

According to conventional art such as above-described patent document, a cold-started vehicle cannot calculate TTC with respect to other vehicle until the almanac data is acquired. Also, location information of the own vehicle cannot be transmitted, so that other vehicles cannot calculate TTC with respect to the own vehicle.

According to the configuration of the present embodiment, once the pseudo range is obtained, TTC can be identified before acquiring the almanac data. Hence, the configuration of the present embodiment is effective for, other than a case where the number of captured satellite is less than 4, or immediately after the cold-start of either the first vehicle Ma or the second vehicle Mb.

Embodiments of the present disclosure have been described. The present disclosure is not limited to the above-described embodiments. However, the present disclosure includes, within the technical scope thereof, various modifications which will be described later. Further, the embodiments can be modified by other than the following modifications and embodied without departing from the spirit of the present disclosure.

The same reference symbols are applied to elements having the same function as the elements in the above-described embodiments and explanation thereof are omitted. In the case where only a part of elements are described, the above-described configurations can be applied to other portions.

[Modification Example 1]

According to the above-described embodiments, in the combination selection process at step S70, an aspect was exemplified where satellite combination having a large absolute value of the change degree $\alpha$ is firstly selected. However, it is not limited thereto. As shown in a procedure of FIG. 6, 2 pairs of satellite combinations used for the collision determination can be determined (referred to as modification 1).

Figure 6:
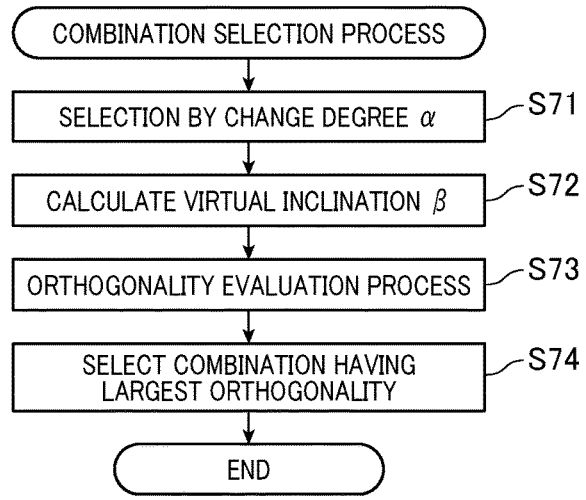
FIG. 6 is a flowchart showing a combination selection process in modification 1.

FIG. 6 is a flowchart showing a combination selection process in the modification 1. In the flowchart, the procedure is started when process proceeds to step S70 shown in FIG. 4 and step S71 is executed. As an initial state, all satellite combinations in a population defined by GNSS satellites commonly captured by the first vehicle Ma and the second vehicle Mb have been selected as candidates.

First, at step S71, satellite combinations are selected based on the change degree $\alpha$. Specifically, a satellite combination having the change degree $\alpha$ exceeding a predetermined change threshold is removed from the candidates. The change threshold may be appropriately selected as a design. It should be noted that removing the satellite combination having the change degree $\alpha$ exceeding the change degree $\alpha$ from the candidate is to minimize errors included in TTC. When the selection at step S71 is completed, process proceeds to step S72.

At step S72, virtual inclination $\beta$ is calculated for every satellite combinations remained as candidates by using the following equation. The virtual inclination $\beta$ corresponds to parameter $\beta$ recited in the claims.

$$\beta = -\frac{x_m\sqrt{x_n^2+y_n^2+z_n^2} - x_n\sqrt{x_m^2+y_m^2+z_m^2}}{y_m\sqrt{x_n^2+y_n^2+z_n^2} - y_n\sqrt{x_m^2+y_m^2+z_m^2}} \quad (7)$$

The parameters $x_m$, $y_m$, $z_m$ in the above-equation (7) represents the current location of one GNSS satellite in 2 GNSS satellites composing the satellite combination in the three-dimensional coordinate, and the parameters $x_n$, $y_n$, $z_n$ represents the current location of the other GNSS satellite. In other words, the virtual inclination β is determined by the above equation (7), where current location of either one satellite in 2 GNSS satellites composing the satellite combination is $(x_m, y_m, z_m)$, and current location of the other satellite is $(x_n, y_n, Z_n)$.

The current location of the GNSS satellites may be identified based on ephemeris transmitted from the respective GNSS satellites. The ephemeris may be obtained from decode information of the GNSS satellite. Also, data correlated to the ephemeris may be obtained from an external server or the like via a broadband network. Moreover, data correlated to ephemeris may be obtained with various method, e.g., obtaining data from other vehicle via an inter-vehicle communication or the like.

When projecting points each having 0 double difference D in a satellite combination, on x-y plane of three-dimensional coordinate system, the group of the points shows a linear function having a predetermined inclination. The virtual inclination β determined by the equation (7) corresponds to the inclination of the linear function. At step S72, when the calculation of the virtual inclination β is completed for every satellite combination candidate, process proceeds to step S73.

Figure 7:
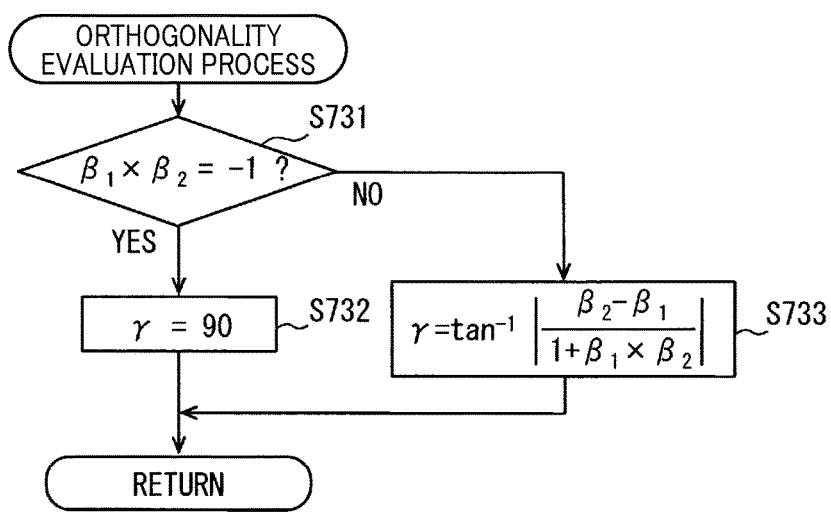
FIG. 7 is a flow chart showing an orthogonal factor evaluation process.

At step S73, an orthogonality evaluation process is performed for a pair of combination which is 2 pairs of satellite combinations (hereinafter referred to as combination set) and proceeds to step S74. The orthogonality evaluation process at step S73 evaluates the orthogonality γ of virtual inclinations β in 2 pairs of satellite combinations which compose the combination set. The orthogonality evaluation process will be described with reference to the flowchart shown in FIG. 7. For convenience, the virtual inclination β of 2 pairs of satellite combination composing the combination set is defined as β1 and β2.

At step S731, process determines whether or not a value where β1 is multiplied by β2 is −1. When the multiplied value is −1, step S731 is determined as affirmative and process proceeds to step S732. On the other hand, when the multiplied value is not −1, step S731 is determined as negative and process proceeds to step S733.

At step S732, the orthogonality γ of the combination set is set to 90. At step S733, process determines, with the following equation (8), the orthogonality γ in the combination set.

$$\gamma = \tan^{-1} \left| \frac{\beta_2 - \beta_1}{1 + \beta_1 \times \beta_2} \right| \quad (8)$$

When calculation of the orthogonality γ for all combination sets is completed, process proceeds to step S74.

At step S74, process selects 2 pairs of satellite combinations composing a combination set having the largest orthogonality, and terminates the procedure of the flowchart.

The combination set selected by these combination selection processes has the largest remaining time difference ΔTrmn among satellite combinations each having the change degree α exceeding a predetermined change threshold. Apparently, in the case where the first vehicle Ma and the second vehicle Mb have a positional relationship showing a collision with high probability, even when selecting the combination set having the largest remaining time difference ΔTrmn, the remaining time difference ΔTrmn in the combination set should be less than the collision threshold THcln. Therefore, accuracy of the collision determination can be improved with the combination set determined with the above-described manner.

[Modification Example 2]

As described, an aspect of determining a combination set is exemplified, which is used for the collision determination using a change degree α or the like. However, any other aspects to determine the combination set can be utilized. Information such as S/N ratio or a bit error rate indicating quality of the reception signal from the GNSS satellite can be used to select the satellite combination. This is because, generally, a GNSS satellite transmitting radio waves having better signal quality enables accurate estimation of the pseudo range to the GNSS satellite without any influence of multi-path issue or the like.

As is well known, the S/N ratio is a signal to noise ratio in logarithmic expression, such that the larger the value, better the signal quality is. The bit error rate is defined as rate of bit errors included in transmission data. When configuration of the modification 2 is used, each of the on-vehicle unit 1 may transmit/receive pseudo range data including signal quality data of captured satellites added thereto.

[Modification Example 3]

As the pseudo range associated information recited in the claims, an aspect has been exemplified that pseudo range data showing pseudo range for every captured satellite is transmitted/received. However, it is not limited thereto. The pseudo range associated information may be data in which the reception side on-vehicle unit 1 is able to identify the single difference for every satellite combination in the transmission side on-vehicle unit 1.

Accordingly, the respective on-vehicle unit 1 may be configured to transmit the single difference for every satellite combination calculated by the own vehicle single difference calculation unit F1. The data indicating single difference (hereinafter referred to as single difference data) for every satellite combination calculated by the own vehicle single difference calculation unit F1, corresponds to the pseudo range associated information recited in the claims.

[Modification Example 4]

As described, the collision determination apparatus recited in the claims is exemplified as being mounted on vehicle. However, it is not limited to this configuration. In other words, a mobile body provided with the collision determination apparatus recited in the claims is not limited to vehicles.

For example, the mobile body provided with the collision determination apparatus recited in the claims may be a pedestrian or a bicycle (hereinafter referred to as pedestrian or the like). In this case, a portable terminal (e.g., smartphone) carried by a pedestrian can be used as the collision determination apparatus. The portable terminal serving as the collision determination apparatus may be provided with functions corresponding to the control unit 11, the GNSS receiver 12 and the inter-vehicle communication unit 13. For the bicycle, apparatuses corresponding to the on-vehicle unit 1 can be mounted thereon.

The communication manner is not limited to the inter-vehicle communication for transmitting/receiving pseudo range associated information between various apparatuses. As long as radio communication is achieved within a certain area (e.g., within several hundreds of meters), where apparatuses can directly or indirectly communicate from each other, any other communication manners can be utilized. The indirect communication between apparatuses includes an aspect where apparatuses perform radio communication via communication terminals provided along roads (i.e. roadside units) or a broadband communication network

[Modification Example 5]

All of the mobile bodies which compose the driving support system 100 do not necessarily provide all of functions included in the above-described on-vehicle unit 1. For example, pedestrians or the like may be provided with an apparatus 2 (hereinafter referred to transmission apparatus) including a function of transmitting pseudo range associated information data, and excluding a function of receiving pseudo range associated information transmitted from other mobile bodies.

Figure 8:
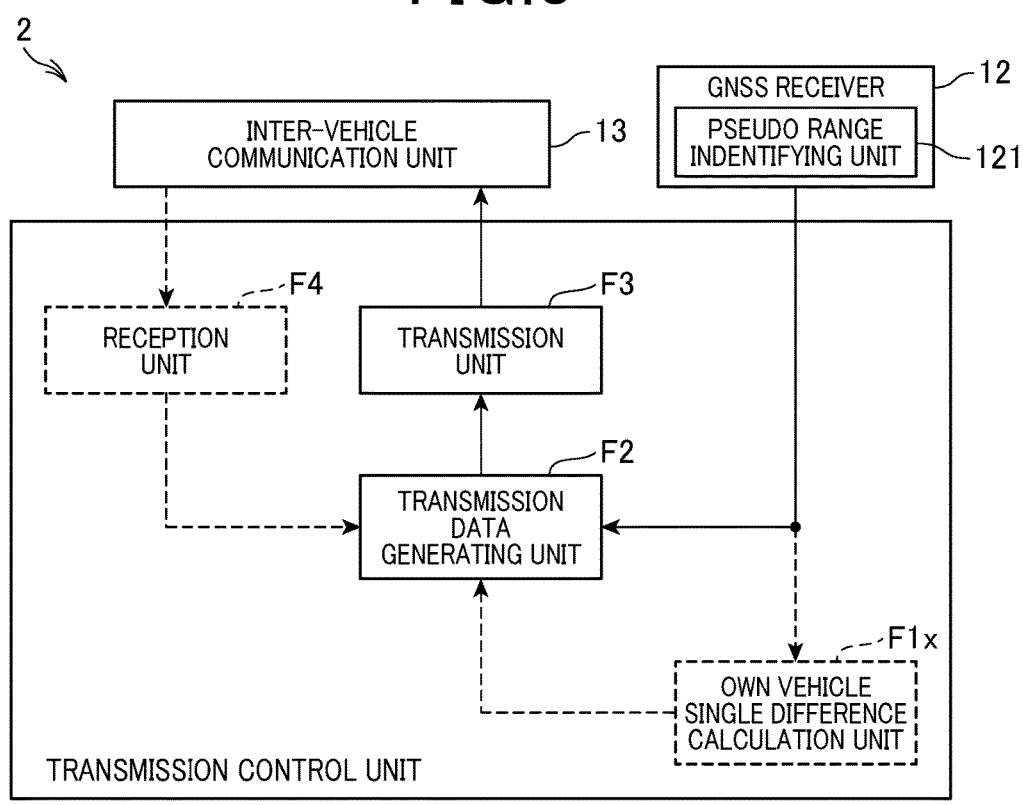
FIG. 8 is a block diagram showing an example of an overall configuration of a transmission unit 2.

For example, such a transmission apparatus 2 may be provided with, as shown in FIG. 8, at least a transmission control unit 11x having a function corresponding to the transmission data generation unit F2, the GNSS receiver 12 and the inter-vehicle communication unit 13. The transmission control unit 11x may include the reception unit F4, an own vehicle single difference calculation unit F1x equivalent to the own vehicle single difference calculation unit F1.

These types of transmission apparatus 2 can be provided cheaply rather than the above-described on-vehicle unit 1. Hence, the transmission apparatus 2 can be promoted for being used by pedestrians or the like.

In the case where the transmission apparatus 2 is used for an apparatus adapted for pedestrians or the like, collision determination may be performed in the vehicle, prompting the driver to pay attention to the pedestrians and the bicycles. The transmission apparatus 2 may report the own pseudo range associated information to vehicles around the own vehicle, and the vehicle side apparatus may perform an alert necessity determination process based on subsequently reported pseudo range associated data.

[Modification Example 6]

In the modification example 5, when the transmission apparatus 2 transmits the pseudo range data as the pseudo range associated information, the pseudo range data may preferably be data showing pseudo ranges with respect to predetermined 3 GNSS satellites. The 3 GNSS satellites may preferably be 3 satellites each having relatively good signal quality such as reception signal strength, S/N ratio or the like. This is because, the GNSS satellites each having better signal quality are more likely to be captured by other on-vehicle units 1 existing around the own vehicle.

Thus, only 3 GNSS satellites are used for the transmission apparatus to transmit the pseudo ranges with respect to these 3 satellites, whereby the absolute location of the transmission apparatus 2 cannot be identified by other apparatuses. In other words, privacy protection of the user who uses the transmission apparatus 2 can be secured.

As one aspect, the transmission apparatus 2 is exemplified in which the pseudo range data is transmitted as the pseudo range data associated information. However, it is not limited to this aspect. For example, as the pseudo range associated information, single difference data can be transmitted instead. In this case, the single difference data represents a single difference for every satellite combination in a population of a predetermined 3 GNSS satellites.

[Modification Example 7]

According to the modification example 5, to produce the apparatus used for the pedestrian or the like to be cheaper, the transmission apparatus 2 limited to transmission function is proposed. However, the transmission apparatus 2 may include the on-vehicle unit 1 and a function performing bi-directional communication. That is, the transmission apparatus 2 may be provided with the reception unit F4.

When the reception unit F4 is necessary for the transmission apparatus 2, the on-vehicle unit 1 and the transmission apparatus 2 may be configured to perform the following operations. Firstly, the on-vehicle unit 1 successively transmits data (hereinafter referred to as specified satellite data) demanding a transmission of pseudo range associated information about a predetermined 3 GNSS satellites. Also, when receiving the specified satellite data, the transmission apparatus 2 returns pseudo range associated information about the GNSS satellites specified by the specified satellite data, in response to the specified satellite data. Thereafter, the on-vehicle unit 1 performs a determination whether or not an approaching relationship is present and a collision determination, based on the pseudo range associated information successively returned from the transmission apparatus 2.

According to these aspects of the embodiments, similar effects of the above-described modification example 7 can be obtained as well. It should be noted that the specified satellite data corresponds to specified satellite information recited in the claims. The transmission apparatus 2 described in the modification example 6 and the modification example 7 correspond to pseudo range information transmission apparatus recited in the claims.

[Modification Example 8]

According to the above-described embodiments, other apparatus used in a mobile body is estimated as a communication partner of the collision determination apparatus such as the on-vehicle unit 1. However, it is not limited thereto. Other apparatus may be used as a fixed terminal fixed at road-side location.

[Modification Example 9]

According to the above-described embodiments, GNSS satellite is exemplified as a reference station recited in the claims. However, it is not limited thereto. The reference station recited in the claims may be a radio base station which composes a public mobile communication network (e.g., reference station of cellular phones).

What is claimed is:

1. A collision determination apparatus used in a mobile body comprising:
    a receiver receiving radio waves including sender information of a sender which transmits the radio waves, the radio waves being transmitted from a plurality of reference stations each being present in mutually different locations;
    a pseudo range identifying unit determining a captured reference station from which the radio waves are received among the plurality of reference stations, and successively identifying a pseudo range to the captured reference station based on the radio waves received by the receiver and transmitted from the captured station;

a self-single difference calculation unit successively calculating a self-single difference between a first reference station and a second reference station which are different from each other, the first reference station and the second reference station being selected from two or more captured reference stations, and the self-single difference being a difference between a first pseudo range which is the pseudo range to the first reference station and a second pseudo range which is the pseudo range to the second reference station;

a transmission unit transmitting pseudo range associated information to surroundings of the mobile body by wireless communication, the pseudo range associated information being determined depending on the pseudo range to the captured reference station identified by the pseudo range identifying unit, and the pseudo range associated information being used for an external apparatus which receives the information to identify the self-single difference in the mobile body;

a reception unit receiving the pseudo range associated information of the external apparatus, the external apparatus being present outside the mobile body;

an external single difference identifying unit successively identifying, based on the pseudo range associated information of the external apparatus received by the reception unit, an external single difference between the pseudo range to the first reference station of the external apparatus and the pseudo range to the second reference station of the external apparatus;

a double difference calculating unit successively calculating a double difference between the self-single difference calculated by the self-single difference calculation unit and the external single difference identified by the external single difference identifying unit; and an approaching relationship determination unit determining whether or not the double difference tends to decrease based on the double difference at a plurality of time points, and determining the external apparatus and the mobile body as being in an approaching relationship when the double difference tends to decrease.

2. The collision determining apparatus according to claim 1, wherein a first combination is defined as a combination of the first reference station and the second reference station, and a second combination is defined as a combination other than the first combination;

the self-single difference calculation unit calculates the self-single difference for the second combination in response to three or more captured reference stations being present;

the external single difference identifying unit identifies the external single difference of the second combination;

the double difference calculation unit successively calculates the double difference of the second combination, based on a difference between the self-single difference of the second combination calculated by the self-single calculation unit and the external single difference of the second combination identified by the external single difference identifying unit; and the approaching relationship determination unit determines that the external apparatus is in an approaching relationship with the mobile body, in response to the double difference in the first combination and the double difference in the second combination tending to decrease.

3. The collision determination unit according to claim 2, wherein the approaching relationship determination unit calculates a first remaining time from the first combination at a plurality of time points, the first remaining time being a required time for the double difference in the first combination to become 0;

calculates a second remaining time from the second combination at a plurality of time points, the second remaining time being a required time for the double difference in the second combination to become 0; and determines that the external apparatus is likely to collide with the mobile body, in response to a difference between the first remaining time and the second remaining time being less than a predetermined collision threshold.

4. The collision determination unit according to claim 3, wherein the approaching relationship determination unit calculates a first combination change degree based on the double difference of the first combination at a plurality of time points, the first combination change degree being a degree of change per unit time of the double difference in the first combination;

calculates the first remaining time by dividing the double difference in the latest first combination by the first combination change degree;

calculates a second combination change degree based on the double difference of the second combination at a plurality of time points, the second combination change degree being a degree of change per unit time of the double difference in the second combination; and calculates the second remaining time by dividing the double difference in the latest second combination by the second combination change degree.

5. The collision determination unit according to claim 3, wherein the approaching relationship determination unit calculates a change degree for three or more combinations of the reference stations in a pair of two reference stations, in response to the three or more captured reference stations being present, the change degree being a degree of change per unit time of the double difference; and combinations where the change degree having a relatively large value among the three or more combinations are preferentially selected for the first combination and the second combination.

6. The collision determination unit according to claim 3, wherein a location of the reference station is expressed in a predetermined three-dimensional coordinate system;

a parameter $\beta$ is calculated for every combination using an equation:

$$\beta = -\frac{x_m\sqrt{x_n^2+y_n^2+z_n^2} - x_n\sqrt{x_m^2+y_m^2+z_m^2}}{y_m\sqrt{x_n^2+y_n^2+z_n^2} - y_n\sqrt{x_m^2+y_m^2+z_m^2}}$$

where parameters $x_m$, $y_m$, $z_m$ represent coordinates in the three-dimensional coordinate system of either one reference station in two reference stations in the combination, and parameters $x_n$, $y_n$, $z_n$ represent the other reference station in the three-dimensional coordinate system; and a combination of parameter β having a maximum orthogonal factor, where the parameter β is defined as an inclination of a straight line, is selected for the first combination and the second combination.

7. The collision determination unit according to claim 6, wherein the approaching relationship determination unit calculates a change degree for three or more combinations of the reference stations in a pair of two reference stations, in response to the three or more captured reference stations being present, the change degree being a degree of change per unit time of the double difference; and the combination in the three or more combinations, having the change degree having a predetermined threshold or more is used for the first combination and the second combination.

8. The collision determination unit according to claim 2, wherein the transmission unit is configured to successively transmit, in response to three or more captured reference stations being present, specified satellite information demanding the external apparatus to transmit the pseudo range associated information thereof, for a predetermined three captured reference stations;

the double difference calculation unit successively calculates the double difference for at least predetermined two combinations, among three combinations of the reference stations as a population of three captured reference stations, based on the pseudo range associated information of the external apparatus for the three captured reference stations, the pseudo range associated information being successively transmitted from the external apparatus as a response to the specified satellite information; and the approaching relationship determination unit determines, based on the double difference successively calculated by the double difference calculation unit, whether or not the external apparatus transmitting the pseudo range associated information as a response is in an approaching relationship with the mobile body.

9. A pseudo range information transmitting apparatus used in a mobile body comprising:

a receiver receiving radio waves including sender information of a sender which transmits the radio waves, the radio waves being transmitted from a plurality of reference stations each being present in mutually different locations;

a pseudo range identifying unit determining a captured reference station from which the radio waves are received among the plurality of reference stations, and successively identifying a pseudo range to the captured reference station based on the radio waves received by the receiver and transmitted from the captured station;

a self-single difference calculation unit configured to calculate a self-single difference data for every combination of two captured reference stations among three or more captured reference stations depending on the pseudo range identified by the pseudo range identifying unit for each of the three or more captured reference stations; and a transmission unit transmitting the self-single difference data as pseudo range associated information to surroundings of the mobile body by a wireless communication.

* * * * *